US012199390B1

(12) United States Patent
Dixon et al.

(10) Patent No.: US 12,199,390 B1
(45) Date of Patent: Jan. 14, 2025

(54) OFFSET ELECTRICAL ADAPTER

(71) Applicants: Travis Dixon, Clemmons, NC (US); Niko Jovicevic, Statesville, NC (US); Bruce Andrew Angel, Stokesdale, NC (US)

(72) Inventors: Travis Dixon, Clemmons, NC (US); Niko Jovicevic, Statesville, NC (US); Bruce Andrew Angel, Stokesdale, NC (US)

(73) Assignee: Camco Manufacturing, LLC, Greensboro, NC (US)

( * ) Notice: Subject to any disclaimer, the term of this patent is extended or adjusted under 35 U.S.C. 154(b) by 384 days.

(21) Appl. No.: 17/932,004

(22) Filed: Sep. 14, 2022

(51) Int. Cl.

| | |
|---|---|
| ***H01R 24/78*** | (2011.01) |
| ***H01R 24/30*** | (2011.01) |
| ***H01R 24/68*** | (2011.01) |
| ***H01R 103/00*** | (2006.01) |

(52) U.S. Cl.
CPC ............. *H01R 24/78* (2013.01); *H01R 24/30* (2013.01); *H01R 24/68* (2013.01); *H01R 2103/00* (2013.01)

(58) Field of Classification Search
CPC ........ H01R 24/70; H01R 24/30; H01R 24/68; H01R 31/06; H01R 27/02; H01R 2103/00
USPC ................................ 439/107, 638, 651, 652
See application file for complete search history.

(56) References Cited

U.S. PATENT DOCUMENTS

| | | | | |
|---|---|---|---|---|
| 3,509,356 A * | 4/1970 | Peebles | H01R 29/00 | 439/652 |
| 3,579,175 A * | 5/1971 | Shroyer | H01R 31/06 | 439/651 |
| 4,659,161 A * | 4/1987 | Holcomb | H01R 31/02 | 439/652 |
| 5,071,370 A * | 12/1991 | Kochan, Jr. | H01R 29/00 | 439/651 |
| 5,562,488 A * | 10/1996 | Neiser | H01R 31/02 | 439/652 |
| 5,672,066 A * | 9/1997 | Yeung | H01R 27/02 | 439/651 |
| 5,857,875 A * | 1/1999 | Hsu | G06F 1/266 | 439/652 |
| 6,045,374 A * | 4/2000 | Candeloro | H01R 25/165 | 439/654 |
| 6,386,921 B1 * | 5/2002 | Casari | H01R 31/06 | 439/651 |

(Continued)

*Primary Examiner* — Gary F Paumen
(74) *Attorney, Agent, or Firm* — Tuggle Duggins P.A.; Blake P. Hurt; Reinier R. Smit

(57) ABSTRACT

An electrical adapter device including a housing assembly and an internal assembly. The housing assembly includes a base and a cover removably joined together using mechanical fasteners. The internal assembly includes a terminal assembly and a receptacle assembly vertically offset from each other to reduce the strain on the components of the device and reduce the chances of an unintended removal of the device from a power source receptacle or the unintended removal of a power cable plug from the device. A handle is disposed and positioned on the cover to provide a non-conductive, thermoplastic handle which may be formed on the cover above a receptacle assembly (i.e., an upper portion of the cover) and partially integrated with the receptacle housing to provide a stable and safe means to grip the device when plugging into or unplugging from a power source.

20 Claims, 9 Drawing Sheets

(56) References Cited

U.S. PATENT DOCUMENTS

| | | | | |
|---|---|---|---|---|
| D549,650 | S | 8/2007 | Russell et al. | |
| D549,651 | S | 8/2007 | Mancari et al. | |
| D559,184 | S | 1/2008 | Russell et al. | |
| D576,552 | S | 9/2008 | Caine et al. | |
| 7,520,783 | B2 * | 4/2009 | Chou .................. | H01R 25/003 439/652 |
| D592,141 | S | 5/2009 | Mancari et al. | |
| D602,434 | S | 10/2009 | Mancari et al. | |
| D635,515 | S | 4/2011 | Atwell et al. | |
| D638,359 | S | 5/2011 | Atwell et al. | |
| D664,095 | S | 7/2012 | Benedict et al. | |
| D700,144 | S | 2/2014 | Benedict et al. | |
| 2009/0156061 | A1 * | 6/2009 | Bernstein ............... | H01R 31/06 439/652 |
| 2010/0112869 | A1 * | 5/2010 | Pyrros .................. | H01R 25/006 439/652 |

* cited by examiner

OFFSET ELECTRICAL ADAPTER

FIELD OF THE INVENTION

The disclosure herein pertains to an electrical adapter generally, and particularly pertains to an offset electrical adapter including a terminal assembly electrically connected to a vertically offset receptacle assembly, both assemblies arranged facing in opposite directions within a housing assembly.

DESCRIPTION OF THE PRIOR ART AND OBJECTIVES OF THE INVENTION

An electrical adapter typically refers to any circuitry or device that converts characteristics of one electric signal, device, or system to those of an otherwise incompatible device or system. Some adapters have the ability to modify power signal characteristics, while others merely adapt the physical form of one connector to another. In general, an adapter enables one type of device to communicate with another. This can be especially helpful when, for example, a user needs a NEMA 14-50R connection but only a NEMA TT-30P connection is available. In this situation, the user may use an adapter to plug in an existing 50-amp power extension cable to an otherwise incompatible 30-amp power source receptacle.

Extreme precaution must be taken while using electrical adapters due to the high voltage that is often associated with power source receptacles. Many existing electrical devices that adapt the physical form of a power source receptacle to a different power source receptacle configuration include terminal assemblies and receptacle assemblies aligned within a housing. Many existing electrical adapter housings are cylindrical bodies that carry a terminal assembly partially protruding from one face of the cylindrical body and a receptacle assembly aligned with the terminal assembly sunken into the opposite face of the cylindrical body. While these types of housings are capable of adapting the physical form of a power source receptacle, these housings typically require a user to grip the entire housing when unplugging from and plugging into a power source receptacle. Gripping the entire housing of electrical adapters having cylindrical housing bodies may cause one or more fingers of the user to slip off and touch a partially exposed electrical contact. An electrical adapter having a dedicated gripping portion would prevent inadvertent touching of a partially exposed electrical contact and would provide a safer and more effective manner to unplug from and plug into a power source receptacle.

In addition to being unsafe, electrical adapters having a terminal assembly and receptacle assembly aligned (or inline) within a housing often causes unnecessary strain on the two assemblies (i.e., the terminal assembly and the receptacle assembly), the electrical wiring within the housing, and the power cable being plugged into the adapter. It is very common, and ultimately detrimental to the structural integrity of the entire electrical adapter system, that power cables connected to electrical adapters dangle toward the earth because many power source receptacles are elevated a predetermined distance above the earth. Over time, the forces subjected to the electrical adapter, for example, but not limited to, gravity and torque, will unnecessarily strain the components. Because, for example, RV power source posts typically include an elevated 30-amp power source receptacle, plugging a 50-amp RV power cable plug into an electrical adapters, which is plugged into the elevated 30-amp power source receptacle creates a moment of force (i.e., torque caused by gravity) about the electrical adapter, resulting in unnecessary strain on the components of the entire electrical adapter system, including the elevated power source receptacle and the RV power cable plug. Over a period of time, repeated strain on the electrical adapter may cause any electrical wires to fray, electrical receptacles to become loose, or electrical contacts (i.e., terminal blades and ground pins) to bend, creating the potential for harmful interaction with the electrical adapter. An electrical adapter having a housing assembly configured (i.e., sized, shaped, otherwise capable) to accommodate for this unnecessary strain would provide a more stable housing and increase the longevity of the components of the electrical adapter.

Thus, in view of the problems and disadvantages associated with prior art devices, the present disclosure was conceived and considering its structure and design, one of its objectives is to provide a safer and more stable electrical adapter that overcomes the challenges faced by existing electrical adapters.

It is another objective of the present disclosure to provide an electrical adapter including a terminal assembly positioned within a cavity formed in an upper portion of a base and a receptacle assembly positioned within a cavity formed in a lower portion of a cover.

It is still another objective of the present disclosure to provide an electrical adapter including at least one electrical contact partially housed within and protruding from a cavity defined in an upper portion of a base and at least one electrical receptacle completely housed within a cavity defined in a lower portion of a cover.

It is yet another objective of the present disclosure to provide an electrical adapter that reduces unnecessary strain on the electrical adapter to increase the longevity of the entire electrical adapter system, including an elevated power source receptacle and an RV power cable plug.

It is a further objective of the present disclosure to provide an electrical adapter including a non-conductive, thermoplastic handle formed above a receptacle assembly and partially integrated with a receptacle housing to provide a safe means to grip the electrical adapter when plugging into or unplugging from a power source receptacle.

It is still a further objective of the present disclosure to provide an electrical adapter comprising a terminal assembly and a receptacle assembly, the electrical adapter configured and arranged to engage a 30-amp (NEMA TT-30) power source receptacle and adapt the 30-amp (NEMA TT-30) power source receptacle to a 50-amp (NEMA-14-50) power source receptacle to enable a 50-amp (NEMA-14-50) power cable plug to engage the power source receptacle and conduct a power signal from the power source receptacle.

It is yet a further objective of the present disclosure to provide an electrical adapter comprising a terminal assembly configured to engage a 30-amp (NEMA TT-30) power source receptacle and a receptacle assembly vertically offset from the terminal assembly, the receptacle assembly configured to receive and engage a 50-amp (NEMA-14-50) power cable plug.

Various other objectives and advantages of the present disclosure will become apparent to those skilled in the art as a more detailed description is set forth below.

SUMMARY OF THE INVENTION

The aforesaid and other objectives are realized by providing an offset electrical adapter for safely gripping the electrical adapter while plugging into or unplugging from a power source receptacle, for reducing unnecessary strain on the electrical adapter caused by elevated power source receptacles, increasing the longevity of the entire electrical adapter system, including the elevated power source receptacle and an RV power cable plug engaging a receptacle assembly of the offset electrical adapter, and for resisting unintended disconnection from a power source caused by gravity, for example. The offset electrical adapter includes a housing assembly, formed by removably joining a base and a cover with a plurality of mechanical fasteners that permit user access to an internal assembly within the housing assembly. The base and cover further include a terminal cavity and a receptacle cavity, respectively. The internal assembly is positioned and supported within the housing assembly and includes a terminal assembly further including a terminal housing configured to carry at least one electrical contact and insert into the terminal cavity, and a receptacle assembly having a receptacle housing configured to carry at least one electrical receptacle and insert into the receptacle cavity. The terminal cavity and the receptacle cavity are formed in the housing assembly and are configured (i.e., sized, shaped, or otherwise capable) to receive and support the terminal assembly and receptacle assembly, respectively, within the housing assembly. The terminal cavity and the receptacle cavity are vertically offset a predetermined vertical distance with the terminal cavity formed near an upper portion (i.e., top half) of the housing assembly and the receptacle cavity formed below the terminal cavity near a lower portion (i.e., bottom half) of the housing assembly. At least one electrical wire electrically connects the terminal assembly to the receptacle assembly to facilitate a power signal from the power source receptacle to a power cable plug electrically adapted to be connected to a system circuit, such as an RV system circuit, for example.

In the preferred embodiment of the offset electrical adapter, a cavity formed in the upper portion of the base defines the terminal cavity configured to hold the terminal assembly and prevent rotational movement therein. A different cavity formed in the lower portion of the cover defines the receptacle cavity configured to hold the receptacle assembly and prevent rotational movement therein. In the preferred embodiment, a terminal assembly includes three (3) electrical contacts (i.e., two (2) terminal blades and one (1) ground pin) configured to engage a 30-amp (NEMA TT-30) power source receptacle and a receptacle assembly includes four (4) electrical receptacles (i.e., three (3) terminal blade receptacles and one (1) ground pin receptacle) configured to engage a 50-amp (NEMA-14-50) power cable plug. In another embodiment, a terminal assembly includes four (4) metal contacts (i.e., three (3) terminal blades and one (1) ground pin) configured to engage a 50-amp (NEMA 14-50) power source receptacle and a receptacle assembly includes three (3) electrical receptacles (i.e., two (2) terminal blade receptacles and one (1) ground pin receptacle) configured to engage a 30-amp (NEMA TT-30) power cable plug. In yet another embodiment, a terminal assembly includes three (3) metal contacts (i.e., two (2) terminal blades and one (1) ground pin) configured to engage a 15-amp (NEMA 5-15) power source receptacle and a receptacle assembly includes four (4) electrical receptacles (i.e., three (3) terminal blade receptacles and one (1) ground pin receptacle) configured to engage a 50-amp (NEMA-14-50) power cable plug. It is preferred that the terminal assembly and receptacle assembly are vertically offset a predetermined distance of at least two (2) inches. A non-conductive handle may be formed on the cover above a receptacle assembly (i.e., an upper portion of the cover) and be partially integrally formed from the receptacle housing to provide a stable and safe means to grip the device when plugging into or unplugging from a power source, especially an elevated power source.

DETAILED DESCRIPTION OF THE PREFERRED EMBODIMENT AND OPERATION OF THE INVENTION

Figure 1:
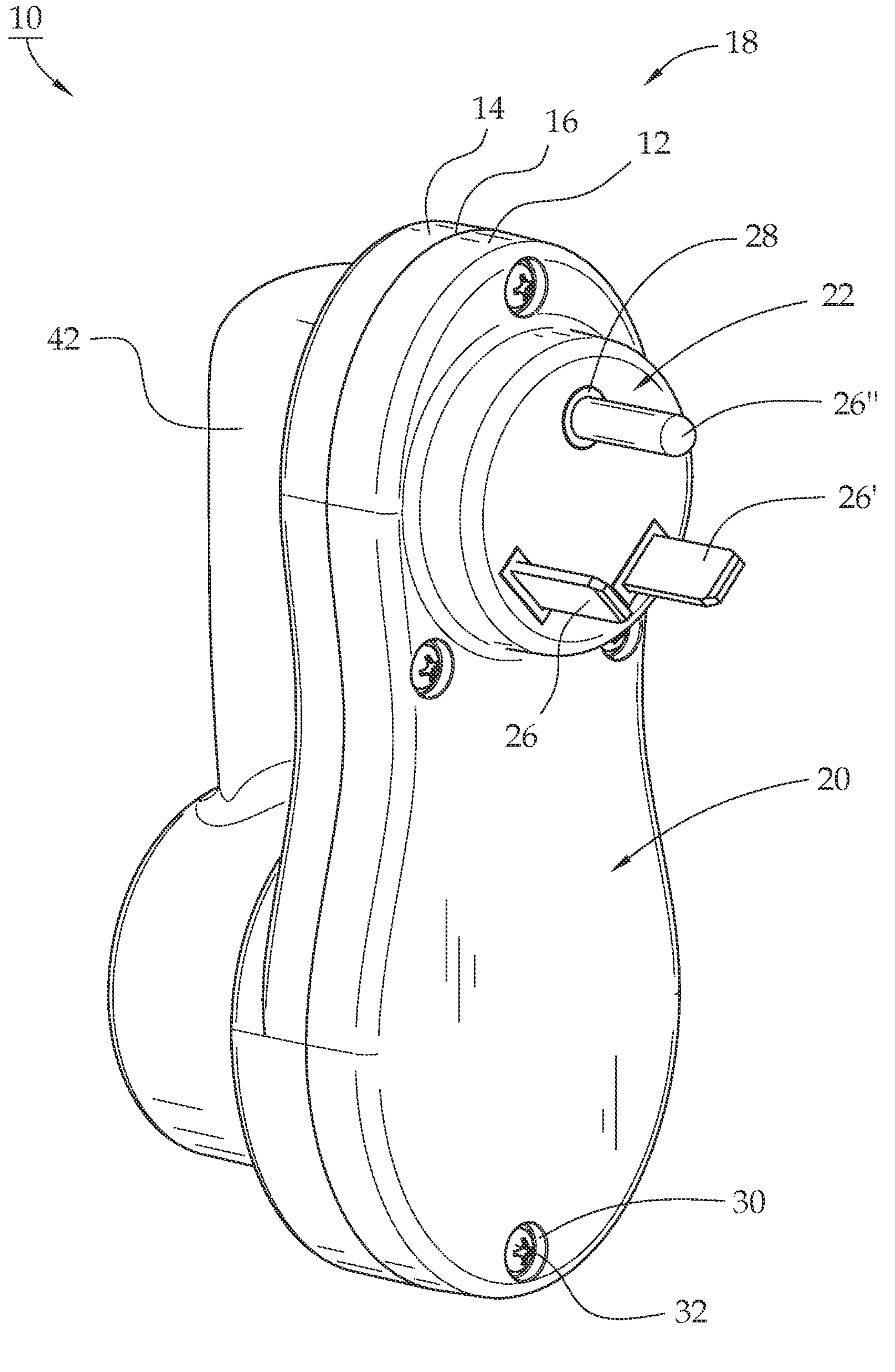
FIG. 1 shows a back perspective view of a preferred embodiment of an offset electrical adapter of the instant disclosure.

Various exemplary embodiments of the present disclosure are described below. Use of the term "exemplary" means illustrative or by way of example only, and any reference herein to "the disclosure" is not intended to restrict or limit the disclosure to exact features or step of any one or more of the exemplary embodiments disclosed in the present specification. References to "exemplary embodiment", "one embodiment", "an embodiment", "various embodiments", and the like may indicate that the embodiment(s) of the disclosure so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the disclosure or to imply that certain features are critical, essential, or even important to the structure or function of the disclosure. Rather, these terms are merely intended to highlight alternative or additional features that may or may not be utilized in a particular embodiment of the present disclosure.

The present disclosure is described more fully hereinafter with reference to the accompanying figures, in which one or more exemplary embodiments of the disclosure are shown. Like numbers used herein refer to like elements throughout. The disclosure may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the disclosure, and any and all equivalents thereof. Moreover, many embodiments such as adaptations, variations, modifications, and equivalent arrangements will be implicitly disclosed by the embodiments described herein and fall within the scope of the instant disclosure.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items but does not exclude a plurality of items of the list.

For exemplary methods or processes of the disclosure, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present disclosure.

Additionally, any references to advantages, benefits, unexpected results, or operability of the present disclosure are not intended as an affirmation that the disclosure has previously been reduced to practice or that any testing has been performed. Likewise, unless stated otherwise, use of verbs in the past tense (present perfect or preterit) is not intended to indicate or imply that the disclosure has previously been reduced to practice or that any testing has been performed.

Figure 7:
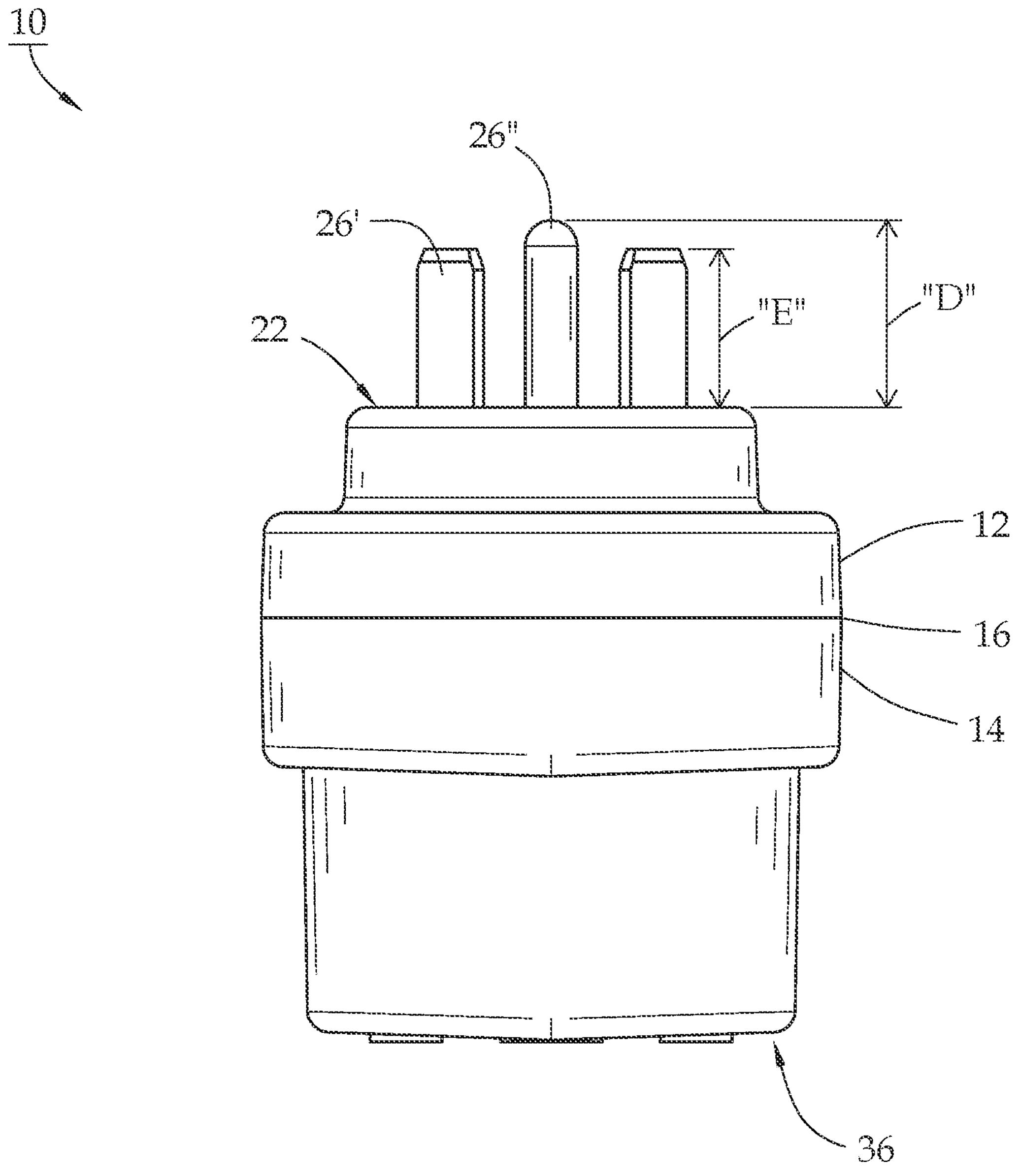
FIG. 7 pictures a bottom plan view of the offset electrical adapter of FIG. 1.
Figure 8:
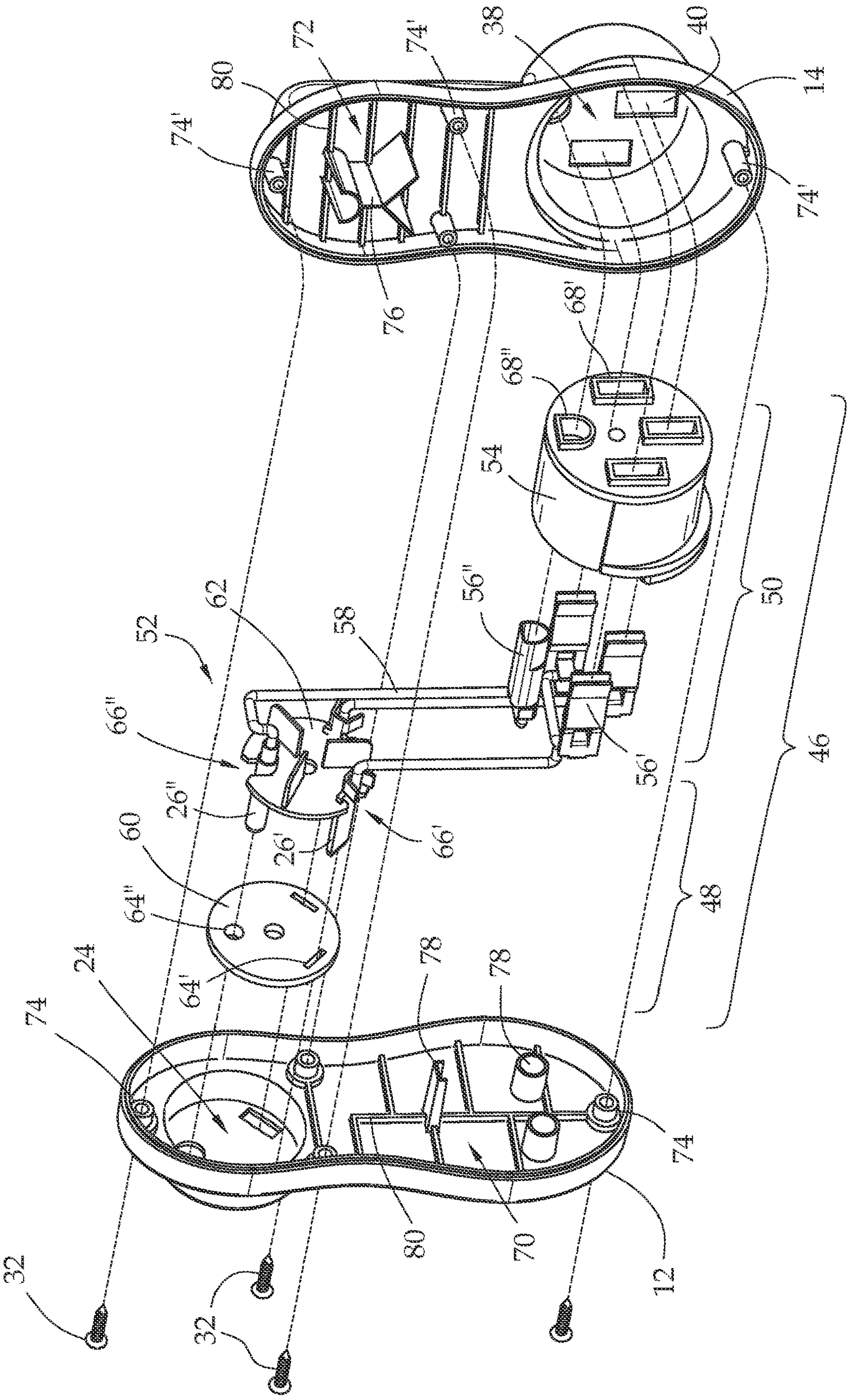
FIG. 8 demonstrates an exploded perspective view of the offset electrical adapter of FIG. 1.
Figure 9:
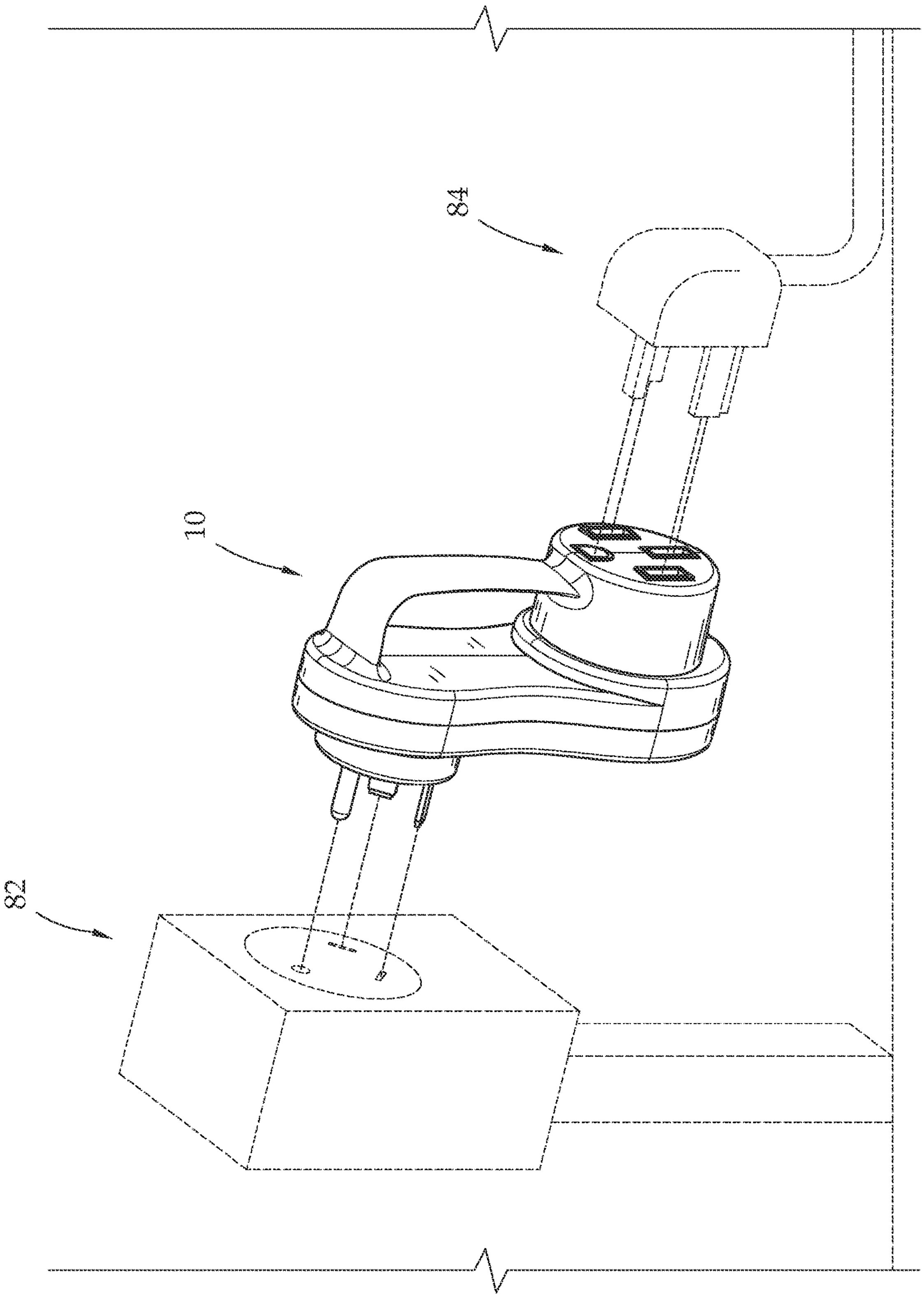
FIG. 9 illustrates a perspective view of the offset electrical adapter of FIG. 1 being used in a preferred environment.

For a better understanding of the disclosure and its operation, turning now to the drawings, FIGS. 1-9 illustrate various views and orientations of the preferred embodiment of an offset electrical adapter. Throughout the description and figure illustrations, the offset electrical adapter, as seen in FIGS. 1-9, is represented as offset electrical adapter 10 for adapting a power source receptacle 82 configuration to render an otherwise incompatible power cable plug 84, compatible with the power source receptacle 82 configuration (FIG. 9). The offset electrical adapter 10 includes a housing assembly 18 and an internal assembly 46 positioned and supported within the housing assembly 18. The housing assembly 18 is formed by removably joining a base 12 and a cover 14 using a plurality of mechanical fasteners 32. The internal assembly 46 includes a terminal assembly 48 and a receptable assembly 50, both assemblies are electrically connected (i.e., in electrical communication) via electrical wiring 58. The terminal assembly 48 includes a terminal housing 52 configured to carry at least one electrical contact 26 and insert into a terminal cavity 24 formed in an upper portion (i.e., top half) of the housing assembly 18. The receptacle assembly 50 includes a receptacle housing 54 configured to carry at least one electrical receptacle 56 and insert into a receptacle cavity 38 formed in a lower portion (i.e., bottom half) of the housing assembly 18. When assembled, the terminal assembly 48 is generally oriented along an upper axis 2 defined as the axis through the center of the terminal cavity 24 and the receptacle assembly 50 is generally oriented along a lower axis 3 defined as the axis through the center of the receptacle cavity 38. The upper axis 2 and the lower axis 3 are vertically offset a predetermined distance "A" such that the terminal assembly 48 and receptacle assembly 50 do not align within the housing assembly 18.

As demonstrated in the rear perspective view FIG. 1, the offset electrical adapter 10 includes a base 12 and a cover 14, each are configured to join to one another along a common edge 16 to form a housing assembly 18. The base 12 includes a substantially planar base exterior surface 20 and a raised, cylindrical base exterior surface 22 formed by a terminal cavity 24 (FIG. 8) formed in the base 12. It is preferred, as shown in FIG. 1, the terminal cavity 24 is formed in an upper portion (i.e., top half) of the housing assembly 18, defining the raised, cylindrical base exterior surface 22. A plurality of electrical contacts 26 (three are shown in FIG. 1) protrude from a plurality of openings 28 defined on the raised, cylindrical base surface 22, the electrical contacts 26 are configured to engage a power source receptacle 82 (FIG. 9) having a 30-amp (NEMA TT-30) power source receptacle configuration. In another embodiment (not shown), the plurality of electrical contacts 26 protrude from the plurality of openings 28 defined on the raised, cylindrical base surface 22 and the electrical contacts 26 are configured to engage a power source receptacle 82 having a 50-amp (NEMA 14-50) power source receptacle configuration. In yet another embodiment (not shown), the electrical contacts are configured to engage a power source receptacle 82 having a 15-amp (NEMA 5-15) power source receptacle configuration. Openings 28 also seen in FIG. 3, may be configured (i.e., sized, shaped, otherwise capable) to define an opening 28' configured to receive a terminal blade contact 26'. Openings 28 may also be configured (i.e., sized, shaped, otherwise capable) to define an opening 28" configured to receive a ground pin contact 26". The substantially planar base exterior surface 20 is further defined by a plurality of holes 30 (FIG. 3) for the receipt of one or more mechanical fasteners 32 configured to secure the base 12 to the cover 14 to form the housing assembly 18. It is preferred, as shown in FIG. 3, at least one hole 30' is defined in the upper portion (i.e., top half) of the substantially planar base exterior surface 20 and at least one hole 30" is defined in the lower portion (i.e., bottom half) of the substantially planar base exterior surface 20.

Figure 2:
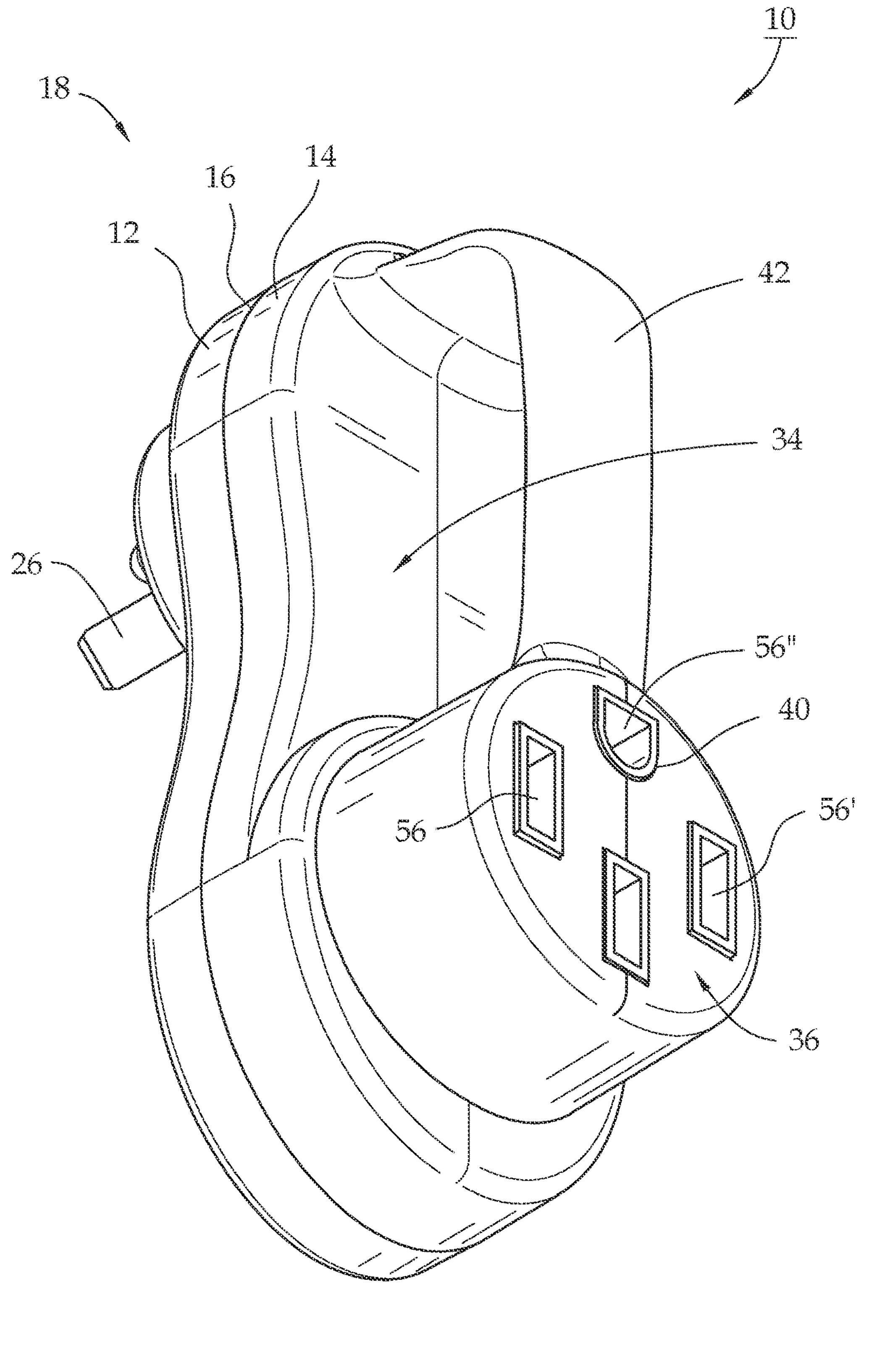
FIG. 2 pictures a front perspective view of the offset electrical adapter of FIG. 1.

FIG. 2 illustrates a front perspective view of offset electrical adapter 10 showing the base 12 and cover 14 joined together along the common edge 16. The cover 14 includes a substantially planar cover exterior surface 34 and a raised, cylindrical cover exterior surface 36 formed by a receptacle cavity 38 (FIG. 8) formed in the cover 14. It is preferred, as shown in FIG. 2, the receptacle cavity 38 is formed in the lower portion (i.e., bottom half) of the housing assembly 18, defining the raised, cylindrical cover exterior surface 36. A plurality of electrical receptacles 56 (best seen in FIG. 8) are fully recessed within receptacle housing 54 which will align and seat within receptacle cavity 38 formed in the cover 14. As seen in FIG. 8, receptacle housing 54 includes a series of complimentary channels 68 having a raised outer edge which align with and engage a series of openings 40 formed within raised, cylindrical cover exterior surface 36 such that the plurality of electrical receptacles 56 can engage a power cable plug 84. Openings 40 may be configured (i.e., sized, shaped, otherwise capable) to define an opening 40' configured to receive a terminal blade 26' receptacle 56'. Openings 40 may also be configured (i.e., sized, shaped, otherwise capable) to define an opening 40" configured to receive a ground pin receptacle 56". In the preferred embodiment, the openings 40 and electrical receptacles 56 are configured and arranged to enable a 50-amp (NEMA 14-50) power cable plug 84 to engage the plurality of electrical receptacles 56 and conduct a power signal from the power source receptacle 82. In another embodiment (not shown) the openings and electrical receptacles are configured and arranged to enable a 30-amp (NEMA TT-30) power cable plug to engage the plurality of electrical receptacles and conduct a power signal from the power source receptacles. The cover 14 also includes a handle 42 (FIG. 5) to provide a user a safe means for gripping the offset electrical adapter 10 when the offset electrical adapter 10 is being unplugged from or plugged into a power source receptacle 82.

Figure 3:
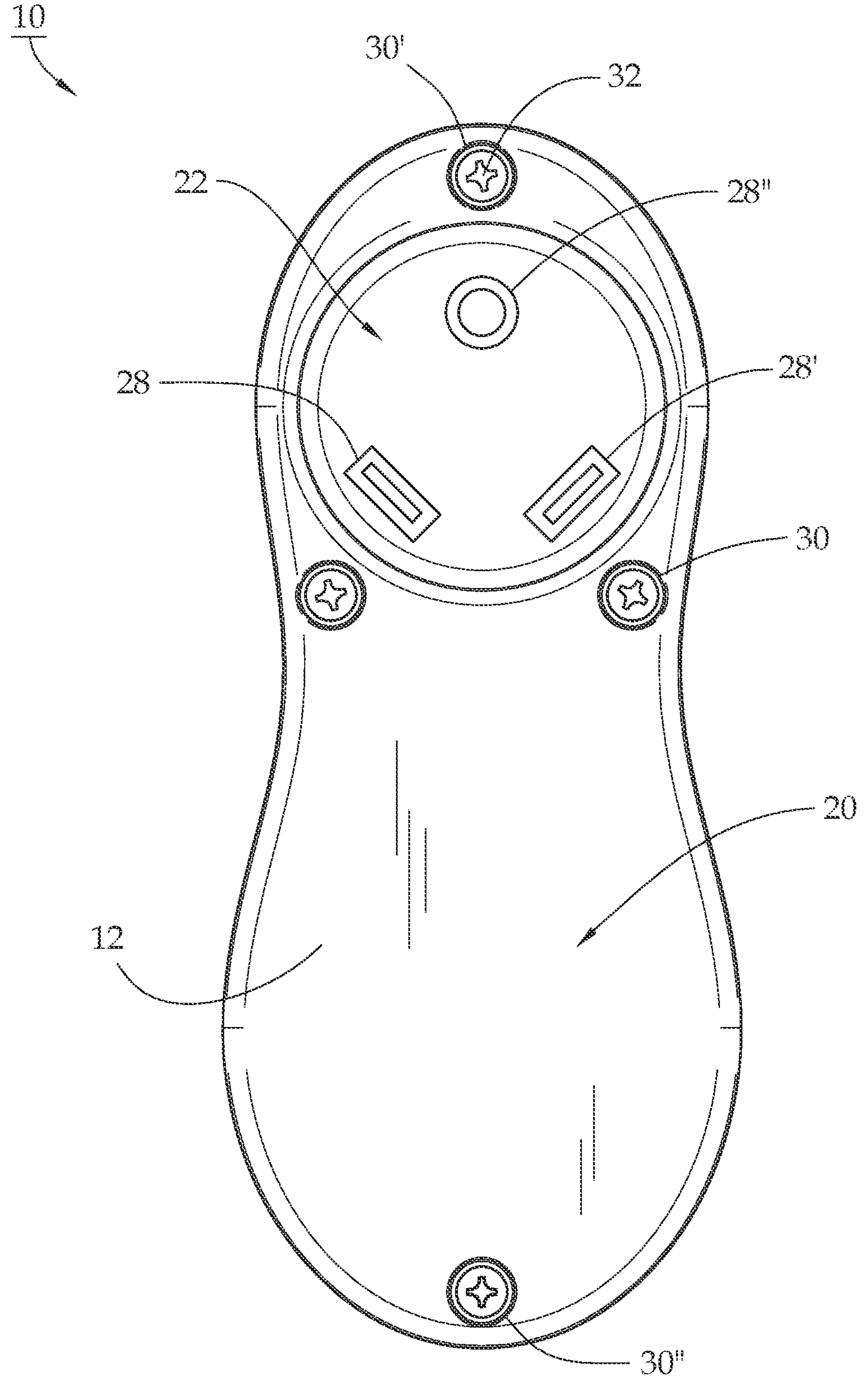
FIG. 3 demonstrates an elevated back-side view of the offset electrical adapter of FIG. 1.

FIG. 3 depicts an elevated back view of the preferred offset electrical adapter 10 showing the plurality of holes 30 defined on the substantially planar base exterior surface 20 and the plurality of openings 28 defined in the raised, cylindrical base exterior surface 22. The plurality of holes 30 may be configured (i.e., sized, shaped, and otherwise capable) to receive a mechanical fastener 32 to removable join the cover 14 and the base 12 together to form the housing assembly 18. The plurality of openings 28 may be configured (i.e., sized, shaped, and otherwise capable) to permit a portion of the electrical contacts 26 of a terminal assembly 48 to protrude from within the housing assembly 18 through the openings 28 in the raised, cylindrical base exterior surface 22, also seen in FIGS. 5 and 6. In the preferred embodiment, as shown in FIG. 3, the substantially planar base exterior surface 20 is defined by four (4) holes 30 configured (i.e., sized, shaped, and otherwise capable) to receive the mechanical fastener 32 to removably join the cover 14 to the base 12, along a common edge 16, to form the housing assembly 18. It is further preferred, as shown in FIG. 3, that at least one hole 30' is defined in the upper portion (i.e., top half) of the substantially planar base exterior surface 20 and one hole 30" is defined in the lower portion (i.e., bottom half) of the substantially planar base exterior surface 20.

Figure 4:
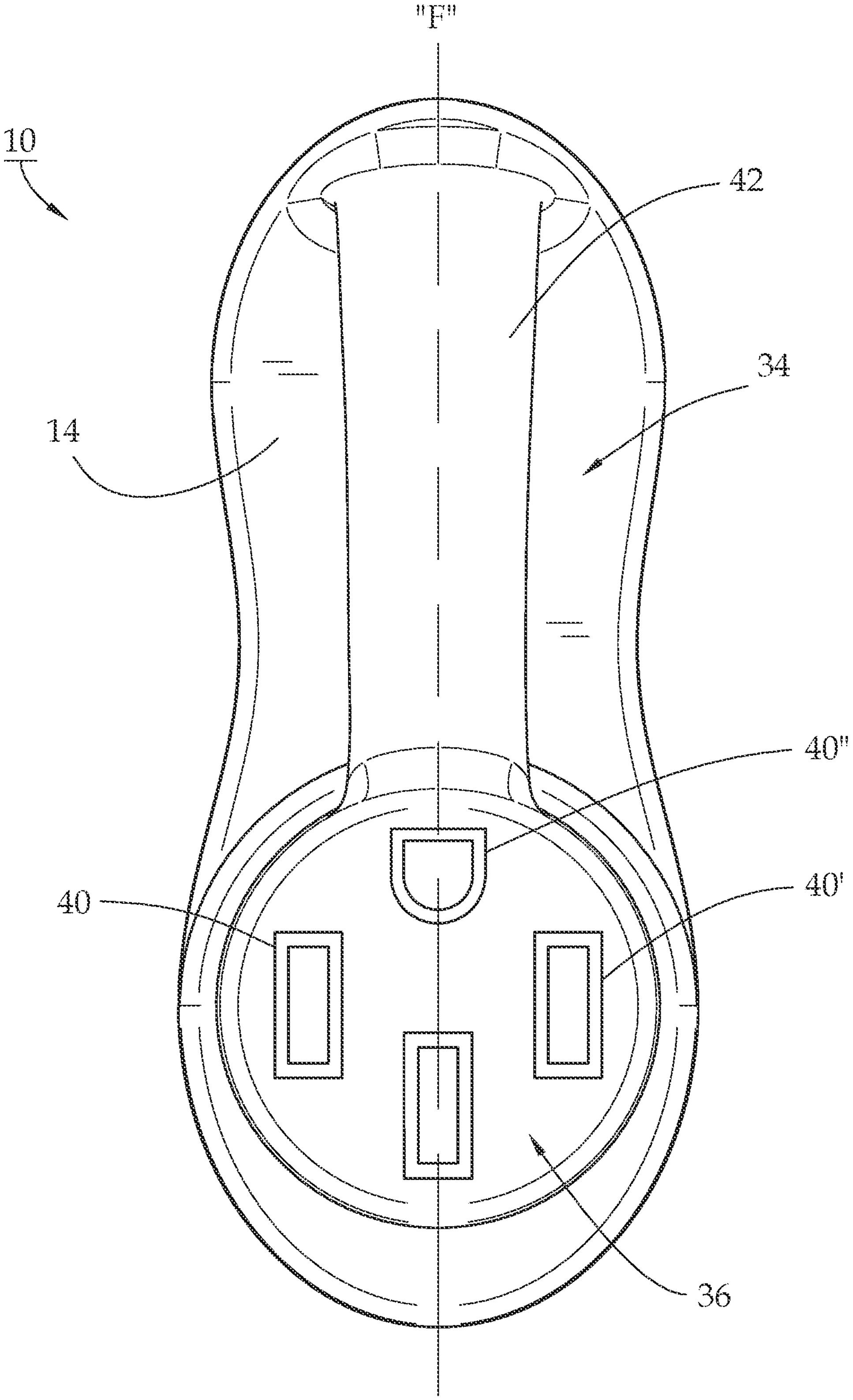
FIG. 4 depicts an elevated front-side view of the offset electrical adapter of FIG. 1.

FIG. 4 illustrates an elevated front view of the preferred offset electrical adapter 10 showing the cover 14 of the housing assembly 18. The handle 42 may be affixed or integrally formed on the cover 14 to facilitate a safe way to grip the offset electrical adapter 10. The handle 42 is preferably a pull handle oriented along longitudinal axis "F" of the cover 14, wherein both ends of the handle 42 are connected to the cover 14 by using handle fasteners (not shown) or wherein both ends of the handle 42 are integrally formed with the cover 14. In an alternative embodiment, the handle 42 may be oriented perpendicular to the longitudinal axis "F" of the cover 14 (not shown). In yet another embodiment, the handle 42 may be an L-Handle, wherein a single end of the handle 42 is fastened to or integrally formed with the cover 14 (not shown).

Figure 5:
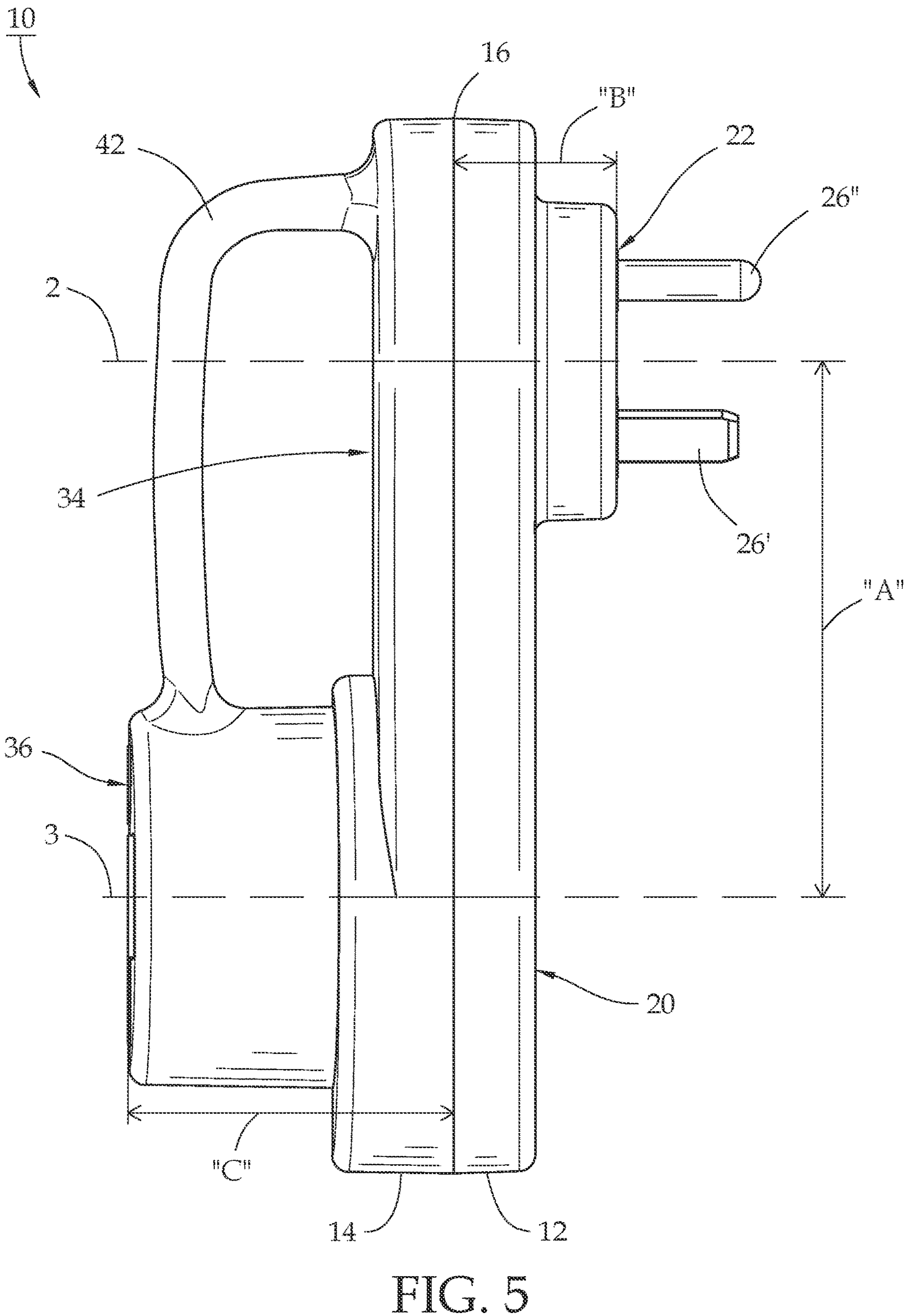
FIG. 5 illustrates an elevated right-side view of the offset electrical adapter of FIG. 1, it being understood that the opposing side view is a mirror image thereof.

As demonstrated in FIG. 5, the base 12 and cover 14 are configured (i.e., sized, shaped, otherwise capable) to join along the common edge 16 to form the housing assembly 18. The terminal cavity 24 formed in the interior of the upper portion of base 12 and receptacle cavity 38 formed in the interior of the lower portion of cover 14 are offset a predetermined vertical distance "A". The receptacle cavity 38 is formed by an extruded cylinder on the cover 14 and defines a receptacle cavity depth "C" and is generally oriented along a lower axis 3. The terminal cavity 24 is formed by an extruded cylinder on the base 12 and defines a terminal cavity depth "B" and is generally oriented along an upper axis 2. In the preferred embodiment, the receptacle cavity depth "C" defines a distance (or depth) that enables the receptacle cavity 38 to fully receive a receptacle assembly 50 so that the electrical receptacle 56 of the receptacle assembly 50 as seen in FIG. 8 is fully recessed in the receptacle cavity 38. It is also preferred that the terminal cavity depth "B" defines a distance that enables a portion of the electrical contact 26 to protrude from the housing assembly 18 through the openings 28 and engage a power source receptacle 82 as seen in FIG. 9. In another embodiment, the terminal cavity depth "B" defines a distance that enables one end of the handle 42 to affix or integrally form from a portion of the raised, cylindrical cover exterior surface 36 and permit a gripping of the handle 42.

Figure 6:
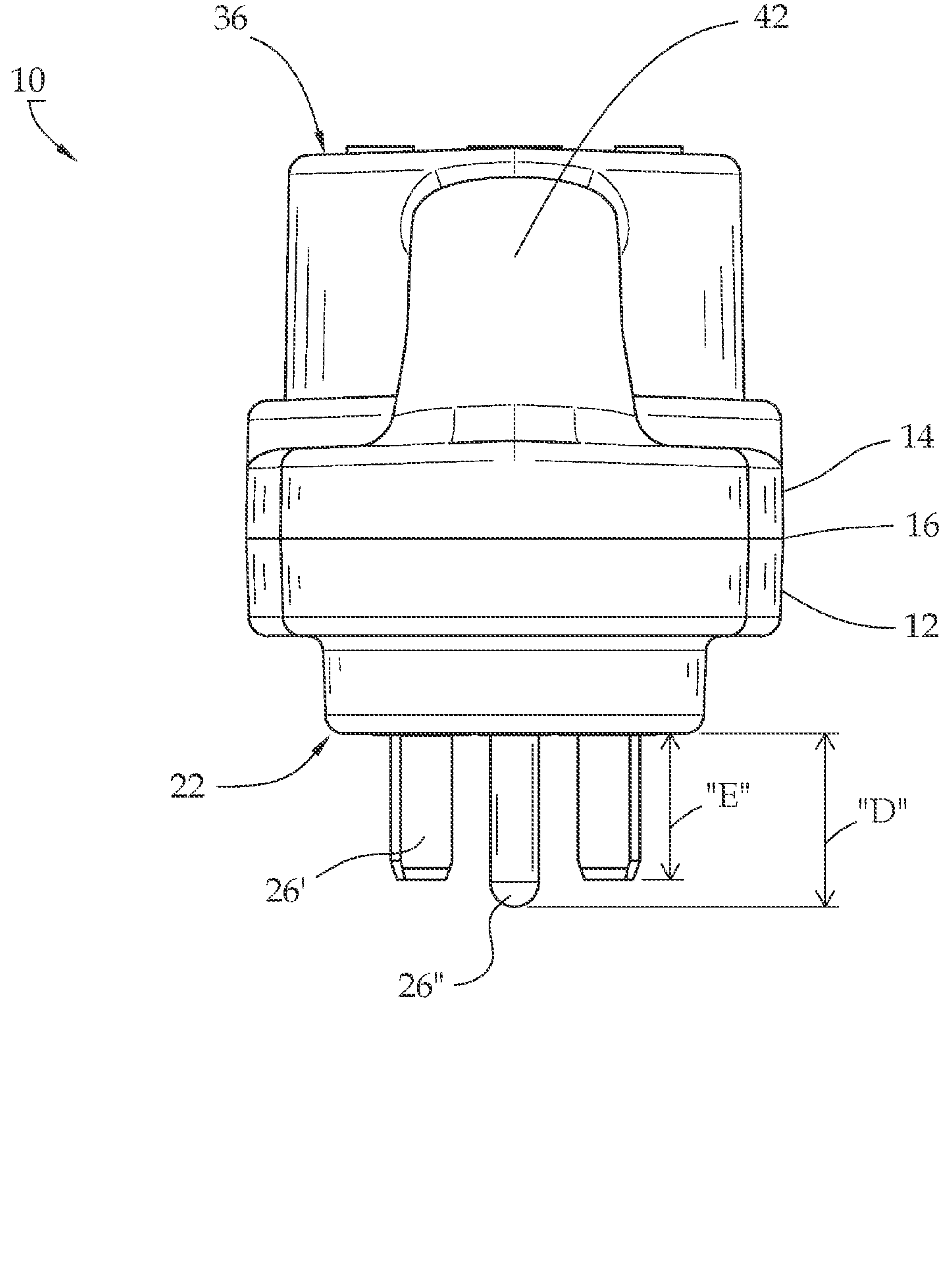
FIG. 6 shows a top plan view of the offset electrical adapter of FIG. 1.

FIGS. 6 and 7 show a top plan view and a bottom plan view, respectively, of the offset electrical adapter 10. The terminal assembly pictured in FIGS. 6 and 7 illustrate a preferred embodiment wherein the terminal assembly configured to engage a 30-amp (NEMA TT-30) power source receptacle 82, the terminal assembly 48 includes three (3) electrical contacts 26, (2) two spaced apart terminal blade contacts 26' and (1) one round-shaped ground pin contact 26". It shall be understood that alternative embodiments (not shown) wherein the terminal assembly is configured to engage a 15-amp (NEMA 5-15) or 50-amp (NEMA 14-50) power source receptacle may exist and are considered within the scope of this disclosure. The cover 14 and the base 12 join at the common edge 16 to form the housing assembly 18. When assembled, the housing assembly 18 is formed with rounded edges to increase the strength and integrity of the housing assembly 18. As shown in FIGS. 6 and 7, a portion of the electrical contacts 26 of the terminal assembly 46 protrude the housing assembly 18. The electrical contacts 26 define a length "E" that corresponds to the distance a protruding terminal blade contact 26' extends beyond the raised, cylindrical base exterior surface 22 and further defines a length "D" that corresponds to the distance a protruding ground pin contact 26" extends beyond the raised, cylindrical base exterior surface 22. When the terminal assembly 48 includes a ground pin electrical contact 26", the ground pin contact 26" protrudes out of the base and extends from the raised, cylindrical base surface 22 a length "D" that is slightly longer than a length "E" to ensure that offset electrical adapter 10 is grounded before any power signal is ever conducted. It is preferred that a terminal assembly 48 that includes a ground pin 26" orients the terminal assembly 48 configuration such that the ground pin 26" is positioned above any terminal blade electrical contacts 26'. Positioning the ground pin electrical contact 26" above any terminal blade electrical contacts 26' safeguards against any accidental contact of the electrical contacts 26 because a falling object is more likely to touch an exposed ground pin 26" first, rather than any exposed terminal blades 26'. In one embodiment, the electrical contacts 26 protrude from the openings 28 in the terminal cavity 24 and extend from the raised, cylindrical base exterior surface 22 at least 15.9 millimeters and no more than 18.3 millimeters, wherein "E" is 15.9 millimeters and "D" is 18.3 millimeters In another embodiment, the electrical contacts 26 protrude from the openings 28 in the terminal cavity 24 and extend from the raised, cylindrical base exterior surface 22, wherein the electrical contacts 26 may protrude less than 15.9 millimeters or more than 18.3 millimeters.

FIG. 8 illustrates a perspective view of the offset electrical adapter 10 with various elements exploded therefrom. An internal assembly 46 is positioned within the housing assembly 18 and includes a terminal assembly 48 and receptacle assembly 50. The terminal assembly 48 includes a terminal housing 52 configured to carry at least one electrical contact 26 so that a portion of the electrical contact 26 protrudes from the housing assembly 18 to engage a power source receptacle 82 to conduct a power signal from the power source receptacle 82. The terminal housing 52 is configured (i.e., sized, shaped, otherwise capable) to be inserted and supported within the terminal cavity 24. The receptacle assembly 50 includes a receptacle housing 54 configured to carry at least one electrical receptacle 56 so that electrical receptacle 56 is fully recessed and concealed in the receptacle cavity 38. The receptacle housing 54 is configured (i.e., sized, shaped, otherwise capable) to be inserted and supported within the receptacle cavity 38. The terminal assembly 48 and receptacle assembly 50 are in constant electrical communication via at least one electrical wire 58.

In the preferred embodiment, as illustrated in FIG. 8, the terminal assembly 48 includes a terminal housing 52 configured to carry three (3) electrical contacts 26, two (2) terminal blade contacts 26' and one (1) ground pin contact 26". It is preferred that the terminal housing 52 includes a front plate 60 and a back plate 62, each defining substantially similar peripheries. The front plate 60 includes a plurality of apertures 64 arranged to cooperatively align with the openings 28 defined in the terminal cavity 24. The back plate 62 includes a plurality of notches 66 around the periphery, the notches 66 are configured to cooperatively align with the plurality of apertures 64 in front plate 60 and the openings 28 defined in the terminal cavity 24. In the preferred embodiment, the front plate 60 defines two (2) apertures 64' configured (i.e., sized, shaped, otherwise capable) to support two (2) electrical terminal blade contacts 26' and further defines one (1) aperture 64" configured (i.e., sized, shaped, otherwise capable) to support one (1) electrical ground pin contact 26". The back plate 62 defines two (2) notches 66' configured (i.e., sized, shaped, otherwise capable) to cooperatively align with the two (2) front plate apertures 64' and configured (i.e., sized, shaped, otherwise capable) to support two (2) electrical terminal blade contacts 26' and further defines one (1) notch 66" configured (i.e., sized, shaped, otherwise capable) to cooperatively align with the one (1) front plate aperture 64" configured (i.e., sized, shaped, otherwise capable) to support the one (1) electrical ground pin contact 26". The terminal assembly 48 may be formed of a non-conductive, thermoplastic housing to safely and securely support at least one terminal contact 26.

In the preferred embodiment, as further illustrated in FIG. 8, the receptacle assembly 50 includes a receptacle housing 54 configured to carry (4) four electrical receptacles 56, (3) terminal blade receptacles 56' and (1) one ground pin receptacle 56". In the preferred embodiment, the receptacle housing 54 includes a cylindrical body that further defines (4) four channels 68 configured (i.e., sized, shaped, otherwise capable) to retain and conceal (4) electrical receptacles 56. In the preferred embodiment, the receptacle housing 54 defines (3) three channels 68' configured to retain and conceal an electrical terminal blade contact receptacle 56', and (1) one channel 68" configured to retrain and conceal an electrical ground pin receptacle 56". The (4) four channels 68 are arranged and configured to cooperatively align with the openings 40 defined in the receptacle cavity 38 to allow a power cable plug 84 to engage the electrical receptacles 56. The receptacle housing 54 may be formed of a non-conductive, thermoplastic housing to safely and securely support at least one receptacle contact 56.

As shown in FIG. 8, the base 12 defines a base interior surface 70, and the cover 14 defines a cover interior surface 72. A plurality of columns 74 are disposed on the base interior surface 70 for the receipt of mechanical fasteners 32 inserted through the holes 30 defined on the substantially planar base exterior surface 20, so that the mechanical fasteners 32 may removably join the base 12 to the cover 14. In the preferred embodiment, four (4) columns 74 are disposed on the base interior surface 70 and are arranged to cooperatively align with the four (4) holes 30 defined on the substantially planar base surface 20. It shall be understood that columns 74 may also be configured on the base interior surface 70 to be concentric (i.e., cooperatively align) with columns 74' disposed on the cover interior surface 72 to create a conduit for the receipt and support of mechanical fasteners 32 which secure the base 12 to the cover 14 along the common edge 16 to form the housing assembly 18.

The cover interior surface 72 includes a terminal housing guide 76 to engage a portion of the terminal housing 52 to provide an additional means for securing the terminal assembly 48 within the housing assembly 18. In the preferred embodiment, as shown in FIG. 8, the terminal housing guide 76 is a Y-shaped extruded projection that engages the terminal housing 52 to create partitions between the plurality of electrical wires 58 and to further restrict the movement, in particular the rotational movement of the terminal assembly 48 within the terminal cavity 24. The terminal housing guide 76 is positioned in the upper portion of the housing assembly 18 and cooperatively aligns with the terminal cavity 24.

The base interior surface 70 preferably includes a receptacle housing guide 78 that engages the receptacle housing 54 to provide an additional means for securing the receptacle assembly 50 within the housing assembly 18. In the preferred embodiment, as shown in FIG. 8, the receptacle housing guide 78 is a plurality of extruded bosses 78 that engage the receptacle housing 54 to further restrict the movement, in particular the rotational movement of the receptacle assembly 50 within the receptacle cavity 38. The receptacle housing guide 78 is positioned in the lower portion of the housing assembly 18 and cooperatively aligns with the receptacle cavity 38.

A plurality of ribs 80 may be formed on the cover interior surface 72, the base interior surface 70, or both. The plurality of ribs 80 are thin (i.e., the length is greater than the width) extensions extruded from any interior surface 70, 72 to provide support and strength to the housing assembly 18. In the preferred embodiment, both the cover 14 and base 12 include interior surfaces 72, 70, respectively, that define a plurality of ribs 80, providing structural integrity to the base 12 and cover 14.

FIG. 9 demonstrates the environment in which the preferred offset electrical adapter 10 is used. In a preferred environment, a power source receptacle 82 (e.g., a campsite power post) including a 30-amp (NEMA TT-30) receptacle configuration and a power cable plug 84 (e.g., a RV power cable) including a 50-amp (NEMA 14-50) terminal configuration are provided. In the environment depicted in FIG. 9, the offset electrical adapter 10 enables the 50-amp power cable plug 84 to engage an otherwise incompatible 30-amp power source receptacle 82. The offset electrical adapter may also be configured to enable a 30-amp power cable plug to engage an otherwise incompatible 50-amp power source receptacle configuration (not shown).

The illustrations and examples provided herein are for explanatory purposes and are not intended to limit the scope of the appended claims.

We claim:

1. An offset electrical adapter device (10), the device (10) comprising:

a housing assembly (18) including a base (12) and a cover (14), the base (12) including a terminal cavity (24), and the cover (14) including a receptacle cavity (38); and an internal assembly (46) positioned within the housing assembly (18), the internal assembly (46) further comprising:

a terminal assembly (48) positioned along an upper axis (2), the terminal assembly (48) including a terminal housing (52) configured to carry at least one electrical contact (26) and be inserted into the terminal cavity (24), a receptacle assembly (50) positioned along a lower axis (3), the receptacle assembly (50) including a receptacle housing (54) configured to carry at least one electrical receptacle (56) and be inserted into the receptacle cavity (38), and at least one electrical wire (58) facilitating electrical communication between the terminal assembly (48) and the receptacle assembly (50), wherein the upper axis (2) and the lower axis (3) are offset in a vertical direction to reduce a strain on the electrical wire (58) facilitating electrical communication when the terminal assembly (48) engages a power source receptacle (82), and a power cable plug (84) engages the receptacle assembly (50).

2. The device of claim 1, further comprising a handle (42) affixed to the cover (14) of the housing assembly (18).

3. The device of claim 2, wherein the handle (42) is attached to a substantially planar cover exterior surface (34) and a raised, cylindrical cover exterior surface (36).

4. The device of claim 1, wherein the at least one electrical contact (26) defines two electrical terminal blade contacts (26') and one electrical ground pin contact (26"), all three electrical contacts (26', 26") configured to engage a 30-amp power source receptacle configuration (NEMA TT-30P) (82).

5. The device of claim 1, wherein the at least one electrical receptacle (56) defines three electrical terminal blade receptacles (56') and one electrical ground pin receptacle (56"), all four electrical receptacles (56', 56") configured to engage a 50-amp power cable plug configuration (NEMA 14-50R) (84).

6. The device of claim 1, wherein the terminal assembly (48) and receptacle assembly (50) are vertically offset a predetermined vertical distance (A).

7. The device of claim 6, wherein the predetermined vertical distance (A) is at least two inches.

8. The device of claim 1, wherein the base (12) and cover (14) are removably joined together with mechanical fasteners (32) to form the housing assembly (18) made of a non-conductive thermoplastic.

9. The device of claim 1, wherein the electrical contacts (26) protrude from the housing assembly (18) to engage the power source receptacle (82).

10. The device of claim 9, wherein the electrical contacts (26) protrude from the housing assembly (18) at least 15.9 millimeters and no more than 18.3 millimeters.

11. An offset electrical adapter device (10), the device (10) comprising:

a housing assembly (18) including:

a base (12) further including a base terminal cavity (24) defining a plurality of terminal openings (28), and a cover (14) further including a cover receptacle cavity (38) defining a plurality of receptacle openings (40), wherein the base (12) and cover (14) removably join to form the housing assembly, an internal assembly (46) including:

a terminal assembly (48) positioned along an upper axis (2) and inserted within the base terminal cavity (24), the terminal assembly (48) including a plurality of electrical contacts (26), and a terminal housing (52) configured to carry the plurality of electrical contacts (26);

a receptacle assembly (50) positioned along a lower axis (3) and inserted within the cover receptacle cavity (38), the receptacle assembly (50) including a plurality of electrical receptacles (56), and a receptacle housing (54) configured to carry the plurality of electrical receptacles (56); and a plurality of wires (58) electrically connected to the terminal assembly (48) and the receptacle assembly (50) to facilitate electrical communication between the terminal assembly (48) and the receptacle assembly (50), wherein the plurality of electrical contacts (26) protrudes from the base to enable electrical engagement between the plurality of electrical contacts (26) and a power source receptacle (82).

12. The device of claim 11, wherein the upper axis (2) and lower axis (3) are offset a predetermined distance (A).

13. The device of claim 12, wherein the predetermined distance (A) is at least two inches.

14. The device of claim 11, further comprising a handle (42) affixed to the cover (14) of the housing assembly (18).

15. The device of claim 14, wherein the handle (42) is attached to a substantially planar cover exterior surface (34) a raised, cylindrical cover exterior surface (36).

16. The device of claim 11, wherein the at least one electrical contact (26) defines two electrical terminal blade contacts (26') and one electrical ground pin contact (26"), all three electrical contacts (26', 26") configured to engage a 30-amp power source receptacle configuration (NEMA TT-30P) (82).

17. The device of claim 11, wherein the at least one electrical receptacle (56) defines three electrical terminal blade contact receptacles (56') and one electrical ground pin contact receptacle (56"), all four electrical receptacles (56', 56") configured to engage a 50-amp power cable plug configuration (NEMA 14-50R) (84).

18. The device of claim 11, wherein the terminal assembly (48) and receptacle assembly (50) are vertically offset at least two inches.

19. The device of claim 11, wherein the electrical contacts (26) protrude from the housing assembly (18) to engage the power source receptacle (82).

20. The device of claim 11, wherein the base (12) and cover (14) are removably joined together with mechanical fasteners (32) to form a housing assembly (18) made of a non-conductive thermoplastic.

* * * * *